United States Patent
Kim et al.

(10) Patent No.: US 11,266,126 B2
(45) Date of Patent: Mar. 8, 2022

(54) BAT EXHIBITION AND VIEWING SYSTEM AND METHOD THEREOF

(71) Applicants: NATIONAL INSTITUTE OF ECOLOGY, Seocheon-gun (KR); Sun-Sook Kim, Gunsan-si (KR)

(72) Inventors: Sun-Sook Kim, Gunsan-si (KR); Yu-Seong Choi, Incheon (KR); Lyoun Kim, Wonju-si (KR); Byeori Kim, Gunsan-si (KR)

(73) Assignees: NATIONAL INSTITUTE OF ECOLOGY, Seocheon-gun (KR); Sun-Sook Kim, Gunsan-si (KR)

( * ) Notice: Subject to any disclaimer, the term of this patent is extended or adjusted under 35 U.S.C. 154(b) by 0 days.

(21) Appl. No.: 17/465,851

(22) Filed: Sep. 3, 2021

(65) Prior Publication Data

US 2021/0392857 A1 Dec. 23, 2021

Related U.S. Application Data

(63) Continuation of application No. PCT/KR2020/010636, filed on Aug. 11, 2020.

(30) Foreign Application Priority Data

Aug. 12, 2019 (KR) .......... 10-2019-0098179

(51) Int. Cl.
*A01K 29/00* (2006.01)
*H04L 67/12* (2022.01)
(Continued)

(52) U.S. Cl.
CPC ........ *A01K 29/005* (2013.01); *G06F 3/04845* (2013.01); *G06N 3/063* (2013.01);
(Continued)

(58) Field of Classification Search
CPC .............. A01K 29/005; G06F 3/04845; H04B 11/00; G09B 5/06
See application file for complete search history.

(56) References Cited

U.S. PATENT DOCUMENTS

| 2004/0081020 A1* | 4/2004 | Blosser .............. G06K 9/00362 367/96 |
| 2020/0121239 A1* | 4/2020 | Lazarini-Serandour ..................... A61B 5/4088 |

FOREIGN PATENT DOCUMENTS

| KR | 10-2002-0026785 | 4/2002 |
| KR | 10-1743756 | 6/2017 |

(Continued)

OTHER PUBLICATIONS

"Du Deu Deu Deuk-" Shh! A Common Big-eared Bat Turned Up. [Retrieved on Nov. 10, 2020], Retrieved from <http://ecotopia.hani.co.kr/462408>. See p. 2, line 1—p. 3, line 11.

(Continued)

*Primary Examiner* — Kathleen V Nguyen
(74) *Attorney, Agent, or Firm* — Lex IP Meister, PLLC

(57) ABSTRACT

According to an embodiment of the present invention, the bat exhibition and viewing system for providing habitat-based bat ecological viewing contents includes: a bat detector including an ultrasonic communication module for detecting an ultrasonic signal of a bat and radiating the ultrasonic signal generated therein to the outside, a signal conversion module for converting the ultrasonic signal of the bat into a social call of an audible band, and an interface module communicating with an external information communication terminal to transmit data received from the signal conversion module; and a viewing contents providing unit installed in the information communication terminal, audibly outputting sound of the bat in accordance with the social call, and extracting intention information matching (Continued)

the social call from pre-learned bat species-specific intention information to visually display the intention information.

18 Claims, 16 Drawing Sheets

(51) Int. Cl.
| | |
|---|---|
| *H04L 65/60* | (2022.01) |
| *G06F 3/04845* | (2022.01) |
| *H04B 11/00* | (2006.01) |
| *G09B 23/36* | (2006.01) |
| *H04N 5/33* | (2006.01) |
| *G06N 3/063* | (2006.01) |
| *G06Q 30/02* | (2012.01) |
| *G09B 5/06* | (2006.01) |
| *H04N 7/18* | (2006.01) |

(52) U.S. Cl.
CPC .......... *G06Q 30/0201* (2013.01); *G09B 5/06* (2013.01); *G09B 23/36* (2013.01); *H04B 11/00* (2013.01); *H04L 65/60* (2013.01); *H04L 67/12* (2013.01); *H04N 5/33* (2013.01); *H04N 7/183* (2013.01)

(56) References Cited

FOREIGN PATENT DOCUMENTS

| | | |
|---|---|---|
| KR | 10-2019-0033892 | 4/2019 |
| KR | 10-2063723 | 1/2020 |

OTHER PUBLICATIONS

"What do the Rats Talk About?" For the First Time in the World, "DeepSqueak", AI for Analysis of Language of Mice, Has Been Introduced). [Retrieved on Nov. 10, 2020], Retrieved from <http://dongascience.donga.com/news/view/26140>. See p. 1, line 2—p. 3, line 2.

* cited by examiner

<SOCIAL CALL OF BAT>

<SONOGRAM WHEN BAT DETECTS DIRECTION AND HUNTS FOR FOOD>

BAT EXHIBITION AND VIEWING SYSTEM AND METHOD THEREOF

TECHNICAL FIELD

The present invention relates to a bat exhibition and viewing system and a method thereof, and more particularly, to a bat exhibition and viewing system and a method thereof that induces participation of viewers visiting to an exhibition hall and support the visitors to directly experience and observe ecological activities of bats and a method thereof.

BACKGROUND ART

In general, exhibition halls such as zoos, botanical gardens, and ecological parks create habitats for various wild animals and plants and provide the habitats for visiting viewers to see.

For example, in the exhibition of animals, ecological education such as a life cycle of birth and growth and adaptation to a seasonal environment and exhibition contents for each animal are prepared and viewed in a certain place.

These conventional exhibitions may show animals in a fixed space, but there is a limit to showing spatial and temporal ecological activities of animals born and grown in a real natural ecological environment. Therefore, most of conventional exhibitions depend on image materials, photo/picture guide boards, and brochures prepared for the ecological environment, and there is a limit in that the conventional exhibitions are passive exhibitions because viewers have to experience and go through contents provided unilaterally.

In particular, there is a problem of relying only on previously prepared models or exhibition contents because the exhibition of bats is made only by viewers to a fixed space and a direct observation of bats is difficult due to nocturnal activities and reclusive nature of bats. In addition, ecological field experience activities conducted in the habitat of wild animals have a limitation in that the ecological field experience activities act as an interference factor to living things in an ecosystem.

Meanwhile, as the importance of education and awareness of conservation of the ecological environment in our society where humans and wild animals coexist increases, there is a demand for improved education and development of exhibition contents according to a change of direction to the active participation exhibition paradigm of visiting viewers by breaking away from the conventional viewing-oriented exhibition.

The matters described in this Background are written to enhance the understanding of the background of the invention, and may include matters that are not conventional art already known to a person of an ordinary skill in the field to which this technology belongs.

The above information disclosed in this Background section is only for enhancement of understanding of the background of the invention, and therefore it may contain information that does not form the prior art that is already known in this country to a person of ordinary skill in the art.

DISCLOSURE

Technical Problem

The present invention has been made in an effort to provide a bat exhibition and viewing system having advantages of constructing and displaying an ecological environment in a habitat of bats through the participation of visiting viewers and directly observing communication and behavior through ultrasonic wave recognition of bats and a method thereof.

Another embodiment of the present invention provides a bat ecology exhibition and viewing system in an open format having advantages of providing ecological activity contents and breaking away from an exhibition paradigm of a fixed space so that viewers may check ecological information of bats anytime and anywhere and a method thereof.

Yet another embodiment of the present invention provides a function as a creator who builds ecological research materials based on the experience activities of viewers participating in exhibition activities, elaborates the research materials, and produces new exhibition contents again.

Technical Solution

An exemplary embodiment of the present invention provides a bat exhibition and viewing system for providing habitat-based bat ecological viewing contents, the bat exhibition and viewing system comprising a bat detector including an ultrasonic wave communication module for detecting an ultrasonic wave signal of a bat and radiating an ultrasonic wave signal generated therein to the outside; a signal conversion module for converting the detected ultrasonic wave signal of the bat into a social call of an audible band; and an interface module communicating with an external information communication terminal to transmit data received from the signal conversion module; and a viewing contents providing unit installed in the information communication terminal, audibly outputting sound of the bat in accordance with the social call, and extracting intention information matching the social call from previously learned bat species-specific intention information to visually display the intention information.

The information communication terminal may be a user terminal carried by a viewer, and the bat detector may further include an interface module communicating with the user terminal to transmit the data received from the signal conversion module to the user terminal, or transfer the data received from the user terminal to the signal conversion module.

The signal conversion module may generate sonogram pattern data by amplifying the detected ultrasonic wave signal of the bat and removing noise, and generate an ultrasonic wave signal according to a sonogram waveform input from the information communication terminal.

The bat exhibition and viewing system may further include a bat-box manufactured in the form of a box provided with an entrance and equipped with observation equipment for obtaining ecological information of the bat including an image and the ultrasonic signal of the bat; a central server for learning the species-specific intention information according to ecological activities of the bat and making a database (DB), and providing on-site viewing contents inside an exhibition hall and online exhibition contents outside the exhibition hall based on the DB; and a repeater connected to the observation equipment through wireless communication to repeat communication with the information communication terminal and the central server.

The observation equipment may include an ultrasonic wave communication module including an ultrasonic wave receiver and an ultrasonic wave transmitter; a wireless communication module for performing wireless communication with at least one information communication terminal among a user terminal and a central server through unique identification information (ID); a camera module including at least one image sensor for photographing ecological information of the bat inhabiting the bat-box; a memory storing information collected by the ultrasonic wave communication module and the camera module at the same time; and a control module for transmitting the ecological information of the bat according to a request of the information communication terminal connected through the repeater.

The image sensor may include a general complementary metal-oxide semiconductor (CMOS) image sensor capable of photographing and recording video and an infrared image sensor capable of night photographing.

The viewing contents providing unit may include a bat observation module for live displaying an ecological image of the bat photographed in the bat-box; a bat sound output module for providing sound experience contents of the bat in which sound of the bat converted into the audible band is audibly output; a sonogram display module for analyzing a sonogram waveform based on the ultrasonic wave of the bat, comparing a pattern of the analyzed waveform with the specifies-specific intention information and displaying confirmed intention information; and a bat messenger module for providing a messenger user interface (UI) that allows visitors to directly communicate with the bat through an ultrasonic wave by utilizing each module of the viewing contents providing unit.

The bat observation module may display real-time ecological image contents of the bat received from the observation equipment corresponding to a selective ID input of the bat-box or display real-time streaming ecological image contents of the bat through access of the central server.

The sonogram display module may determine species of the bat by analyzing a sonogram waveform of echolocation used when the bat detects a direction or hunts for food.

The sonogram display module may provide experience contents in which a behavior of the bat and communication thereof are recognized by identifying intention information between individuals within a bat group through a pattern of the sonogram waveform to display characteristics of a specific voice structure and a function and meaning of the social call.

The bat messenger module may convert a sonogram waveform of certain communication input from the viewer into an ultrasonic wave and transmit the sonogram waveform through the bat detector, and provide experience contents of communication with the bat in which communication with a behavior of the bat reacting to transmission of the ultrasonic wave and sound of echolocation is observed.

The central server may include a visitor management unit for matching and registering the bat-box and viewer information and managing online access; an ecological information collection unit for collecting and storing ecological information including an image and an ultrasonic wave of the bat from the observation equipment of the bat-box; an ecological information analysis unit for analyzing the collected ecological information of the bat to derive a type of the bat, a social call of an audible band, and a sonogram pattern; a bat intention learning unit for deriving the species-specific intention information that is a standard for determining intention information of a sonogram by link learning the ecological information of the bat through a synthetic neural network; a database unit for continuously updating the species-specific intention information learned by the bat intention learning unit; and a control unit for transmitting a live bat image and communication information to the user terminal connected through the viewing contents providing unit based on the ecological information received from the observation equipment when a visitor visits to view.

The bat intention learning unit may train bat image information and sonogram information received by the ecological information analysis unit as input factors through a synthetic neural network that analyzes intention information with respect to ultrasonic wave signals of bats for species.

The synthetic neural network may previously learn to match behavioral characteristic parameters of various species-specific bat image information and intention information parameters according to various sonogram patterns for an intention information analysis of the bat.

The control unit may match and transmit ecological event information of at least one of a moving of the bat, a childbirth and a birthday, a first flight of offspring and a feeding activity success and a hibernation obtained by monitoring a bat-box through the observation equipment to a user terminal of a registered viewer, and provide contents according to the ecological event information upon a request of the viewer accessed online through Internet or the viewing contents providing unit.

The control unit may group registration information of visitors who participated in the production of the bat-box to create a community site of a bat of interest, and provide a live image and ecological event information according to ecological activities of the bat through the community site.

Another embodiment of the present invention provides, a bat exhibition and viewing method of providing viewing contents according to ecological activities of a bat based on a bat exhibition and viewing system includes a) detecting an ultrasonic wave signal of the bat through a bat detector connected to a user terminal of a viewer; b) dividing the ultrasonic wave signal of the bat collected through the bat detector into echolocation and a social call and converting the ultrasonic wave signal into audible sound; c) receiving a signal converted into a social call of an auditable band and audibly outputting sound of the bat by a viewing contents providing unit APP installed in the user terminal; and d) extracting and visually displaying, by the viewing contents providing unit, species-specific intention information matching the detected social call from previously learned species-specific echolocation of the bat and social call data of communication between individuals within a group.

The bat exhibition and viewing method may further include, after d), transmitting a sonogram waveform for communication with the bat as an ultrasonic wave through the bat detector; and providing real-time interactive communication experience contents by analyzing an ultrasonic wave according to a behavior of the bat reacting to transmission of the ultrasonic wave and echolocation and displaying sound of the bat and communication information.

The bat exhibition and viewing method may further include, before a), matching and storing, by the central server, viewer information and a bat-box produced with the participation of visiting viewers; communicating with observation equipment of the bat-box selected through the user terminal by the viewing contents providing unit; and receiving image information from the observation equipment to provide image contents of the bat in the bat-box by the viewing contents providing unit.

The bat exhibition and viewing method may further include, after visiting of a visitor, detecting, by the central server, ecological event information of at least one of a moving of the bat, a childbirth, a birthday, and a hibernation while monitoring the bat-box through the observation equipment; transmitting the ecological event information to the user terminal of visitor information matching an ID of the bat-box; and authenticating the visitor information accessed online according to transmission of the ecological event information, and providing an image of the bat, sound and communication contents recorded at a time of the ecological event information.

Advantageous Effects

According to an exemplary embodiment of the present invention, there is an effect of reconsidering an image of existing bats and stimulating interest in ecological learning by providing a variety of experience contents that allows viewers to directly see, hear, and communicate with bats in a habitat.

There is also an effect of providing viewing contents of bats that overcome temporal and spatial limitations by supporting viewers to directly participate in a production of a bat-box and observe ecological activities of bats of interest inhabiting the bat-box through online.

There is also an effect of constructing an infrastructure for viewing bats that facilitates a habitat expansion by producing a bat-box through participation of viewers and simultaneously utilizing the bat-box as an infrastructure resource for an ecology research of bats.

There is also an effect of constructing a system in which existing passive viewers may be the subject of exhibition and act as creators by collecting new intention information with the participation of viewers and providing various contents supplemented by additional learning, and a more precise interpretation of ecological information is possible through accumulated information and exhibition contents are self-developed and purified.

MODE FOR INVENTION

Figure 1:
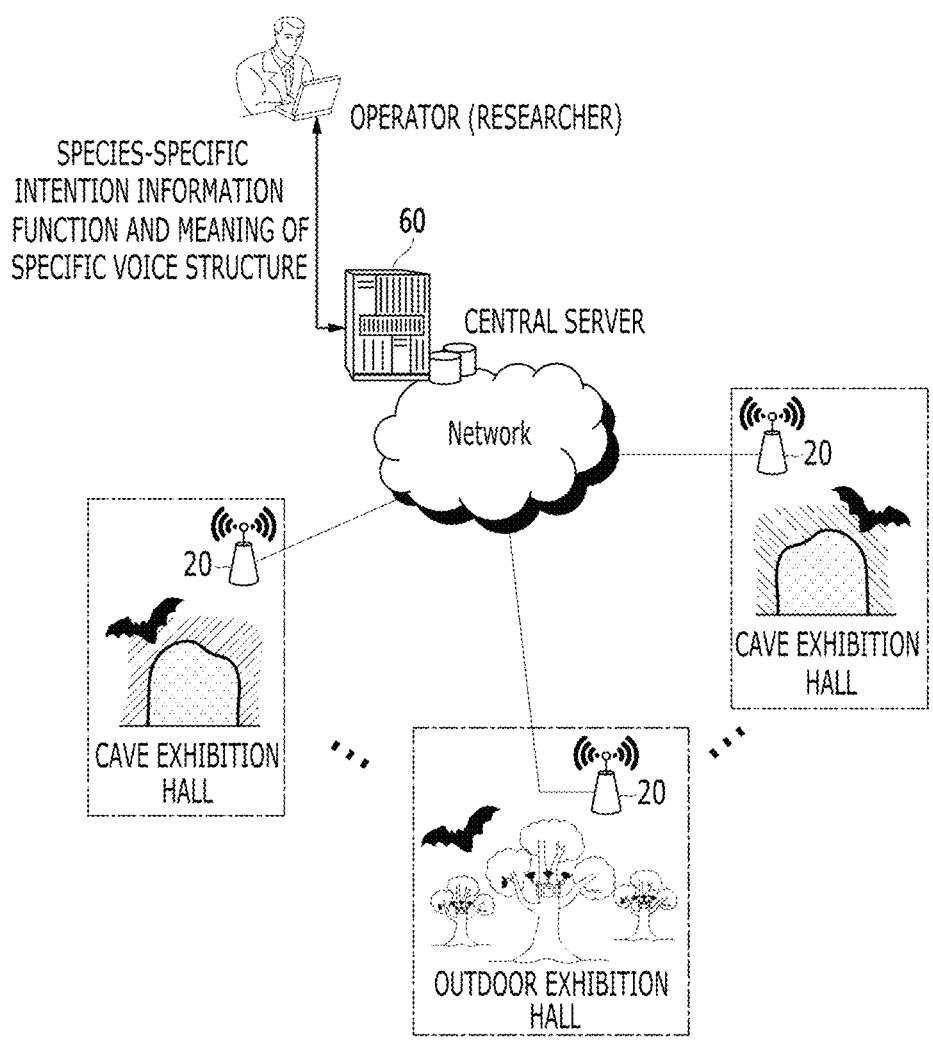
FIG. 1 shows a network structure of a bat exhibition and viewing system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and may be implemented by hardware components or software components, and combinations thereof.

Throughout the specification, the terms such as first, second, etc. may be used to describe various constituent elements, but the constituent elements are not limited by the terms. The terms are used only for the purpose of distinguishing one constituent element from another constituent element. For example, without departing from the scope of the present invention, a first constituent element may be named as a second constituent element, and similarly, the second constituent element may also be named as the first constituent element.

A bat exhibition and viewing system and a method thereof according to an exemplary embodiment of the present invention will be described in detail with reference to the drawings.

FIG. 1 shows a network structure of a bat exhibition and viewing system according to an exemplary embodiment of the present invention.

Figure 2:
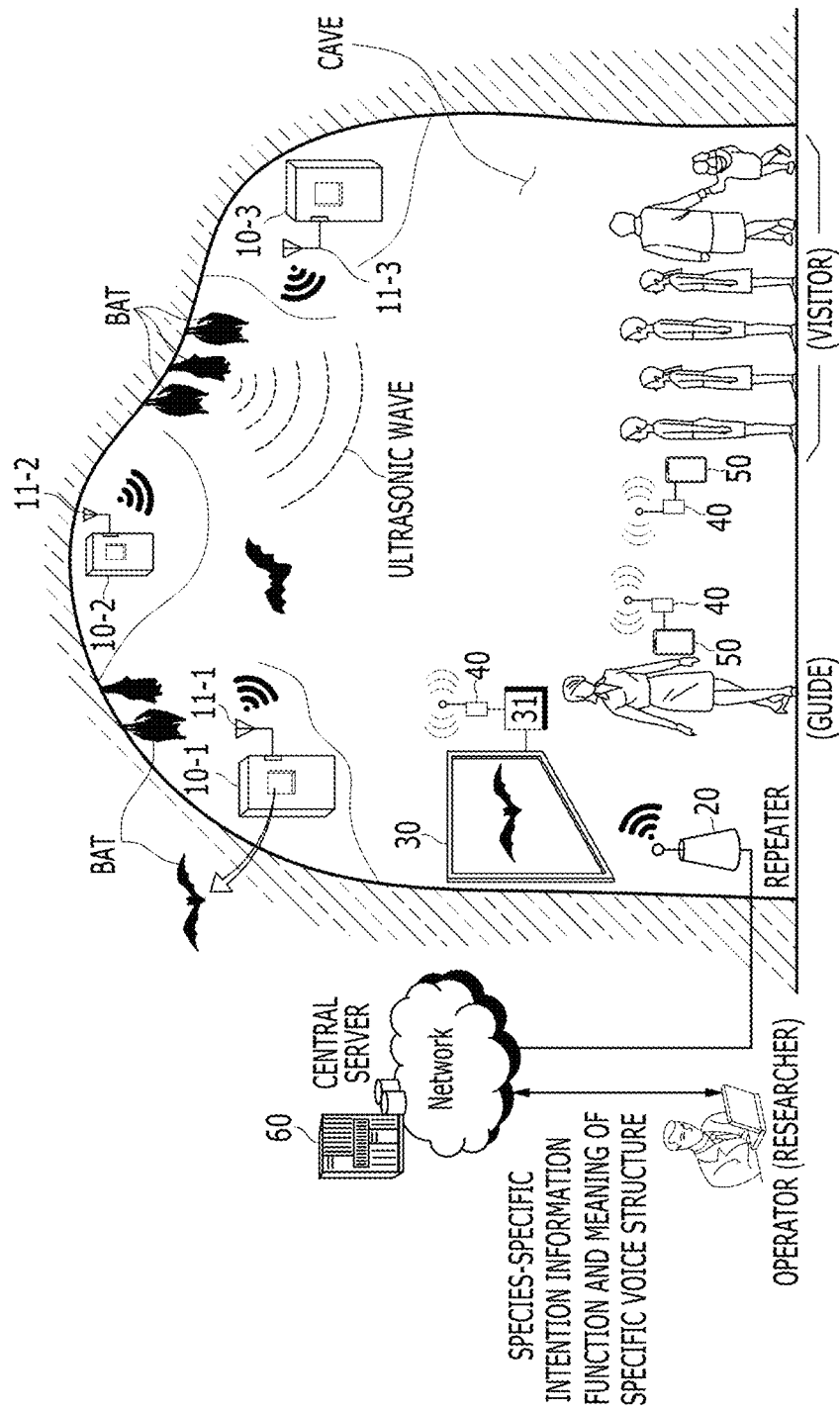
FIG. 2 schematically shows a configuration of bat exhibition and viewing system according to an exemplary embodiment of the present invention.

FIG. 2 schematically shows a configuration of bat exhibition and viewing system according to an exemplary embodiment of the present invention.

Figure 3:
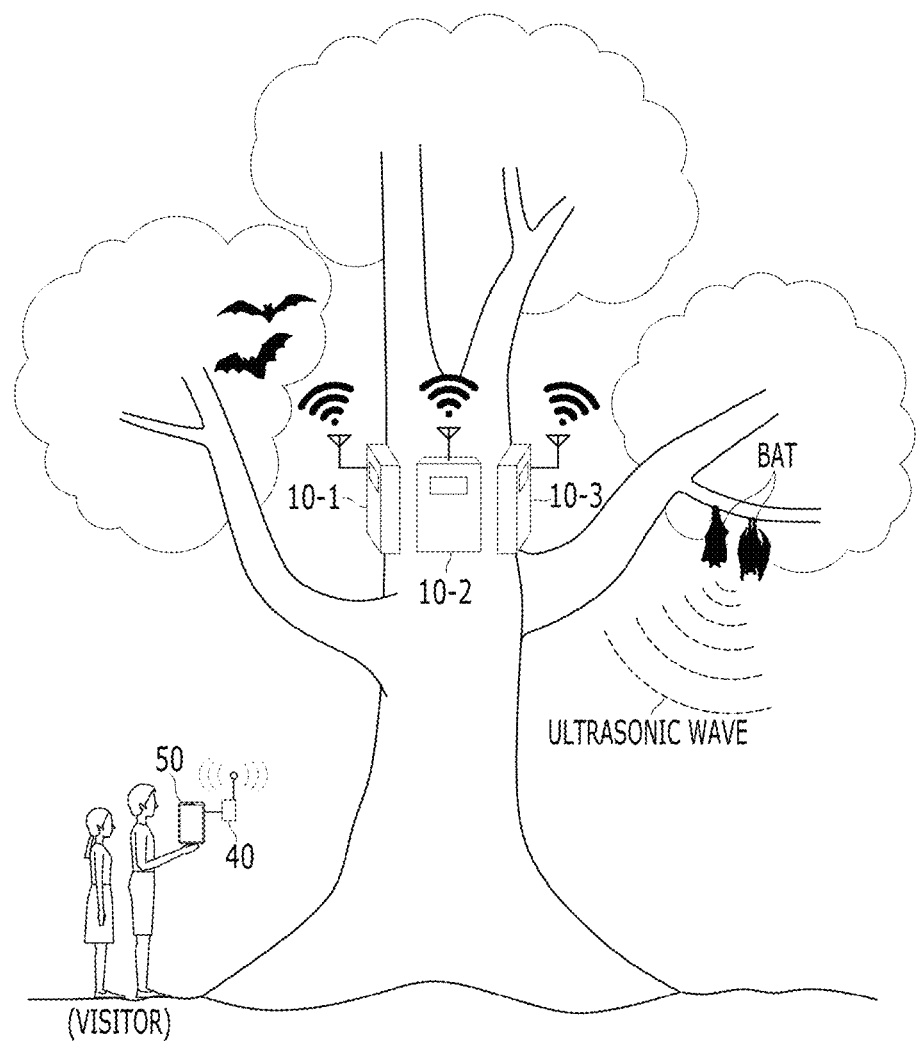
FIG. 3 shows an example of installing a bat-box according to an exemplary embodiment of the present invention.

FIG. 3 shows an example of installing a bat-box according to an exemplary embodiment of the present invention.

Referring to FIGS. 1 to 3, the bat exhibition and viewing system according to an exemplary embodiment of the present invention constructs and exhibits an ecological environment in a habitat of bats through the participation of viewers and provides various viewing contents to directly observe communication and ecological behavior of bats through ultrasonic wave recognition.

To this end, the bat exhibition and viewing system includes a bat-box 10 attached to the habitat, a repeater 20, a display 30, a bat detector 40 and a central server 60.

First, the central server 60 may be connected with exhibition halls prepared locally or based on various ecological environments through a network and constructed as a control system for centrally managing and supporting the exhibition contents of each exhibition hall. In addition, the present invention is not limited thereto, and the central server 60 may be configured as a local server for operating one exhibition hall.

The bat-box 10 is a roost for bats provided with an entrance in the form of a box, and equipped with observation equipment 11 for obtaining ecological information of bats moving and living in the bat-box 10.

The bat-box 10 may be standardized as an assembled model of various materials and designs provided with space for mounting of a habitat and observation equipment 11 of bats.

The bat-box 10 may be assembled with the participation of viewers and attached to habitats such as caves.

Here, the bat-box 10 is not limited to a cave, and may be attached to forests, wetlands, private houses and rivers, etc. to form an exhibition space. For example, as shown in FIG. 2, the bat-box 10 may be installed in various places such as forests, wetlands, and walls of buildings around the National Ecological Center to expand the exhibition space of bats and build research infrastructure of bats.

Meanwhile, the observation equipment 11 is ecological information obtaining equipment including image and sound (ultrasonic wave) of bats and will be described in detail with reference to FIG. 4.

Figure 4:
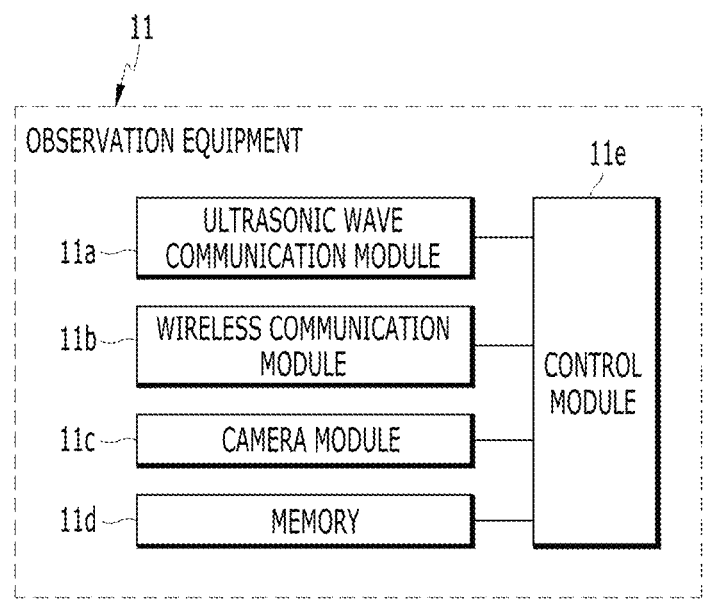
FIG. 4 is a block diagram schematically showing a configuration of observation equipment according to an exemplary embodiment of the present invention

FIG. 4 is a block diagram schematically showing a configuration of observation equipment according to an exemplary embodiment of the present invention.

Referring to FIG. 4, the observation equipment 11 according to an exemplary embodiment of the present invention includes an ultrasonic wave communication module 11a, a wireless communication module 11b, a camera module 11c, a memory 11d and a control module 11e.

The ultrasonic wave communication module 11a includes an ultrasonic wave receiver and an ultrasonic wave transmitter, and may receive an ultrasonic wave generated by a bat or output an ultrasonic wave according to an external reception signal.

The wireless communication module 11b is connected to the repeater 20 through wireless communication and performs wireless communication with at least one information communication terminal among the user terminal 50 and the central server 60 through unique identification information (ID).

The camera module 11c includes at least one image sensor for photographing ecological information of the bat inhabiting the bat-box 10. The image sensor may include a general complementary metal-oxide semiconductor (CMOS) image sensor capable of photographing and recording video and an infrared image sensor capable of night photographing.

The memory 11d stores information collected by the ultrasonic wave communication module 11a and the camera module 11c at the same time.

The control module 11e controls an operation of each module for the operation of the observation equipment 11, and stores the ecological information of the bat generated according to the operation in the memory 11d.

In addition, the control module 11e may transmit the ecological information of the bat according to a request of the information communication terminal connected through the repeater 20.

The observation equipment 11 serves to support viewers (researchers) to selectively obtain the ecological information of the bat that lives and grows in a roost site for each installed bat-box ID.

The repeater 20 is connected to the observation equipment 11 of the bat-box 10 through wireless communication and relays communication with the user terminal 50 and the central server 60.

The repeater 20 may be configured as a base station for connecting a wireless LAN/WiFi or a mobile communication network, and may also be configured as various wireless communication repeaters supporting a known wireless Internet.

The display 30 may visually and aurally display the image of the bat obtained in real time by the observation equipment 11 of at least one bat-box 10 and sound converted from the ultrasonic wave of the bat into an audible band by interaction with the central server 60.

The display 30 is configured through a large monitor or a beam projector, and includes an information communication terminal 31 that processes data received from the observation equipment 11 of the bat-box 10 and the central server 60 through the repeater 20 and display the data through the display 30.

The information communication terminal 31 is a computer, a laptop, a tablet, and a smartphone, etc., and includes a program for providing viewing contents of a bat, which is similar to a detailed configuration of the user terminal 50 to be described later, and thus, refer to the description to be provided below.

The display 30 is a common facility that displays the image of the bat to a viewer in a limited space such as a cave, and may be omitted from an open outdoor exhibition hall and replaced by the user terminal 50 carried by the viewer.

Meanwhile, bats use various structured ultrasonic waves for a direction detection, a food search, and an intragroup communication during ecological activities. For example, bats use a high frequency of 15~120 kHz, and a pulse sound is repeated at various speeds from 1 per second, and, when approaching a target, to hundreds of times per second.

In addition, ultrasonic waves of bats exhibit species-specificity, and provide clues to understand the ecology of bats such as communication, a social structure, reproduction and habitat characteristics through a structure of the ultrasonic waves, and thus the clues may be researched and utilized and provided as exhibition contents. In particular, actual night flight and communication using the ultrasonic waves of bats that may only fly among mammals are suitable as exhibition contents with interesting topics that viewers cannot easily access.

However, because the ultrasonic waves of bats are not audio frequencies, viewers cannot hear the sound, and thus, viewers may hear the ultrasonic waves of bats as converted sound of an audible band by interacting the bat detector 40 capable of detecting the ultrasonic waves of bats with the user terminal 50.

Figure 5:
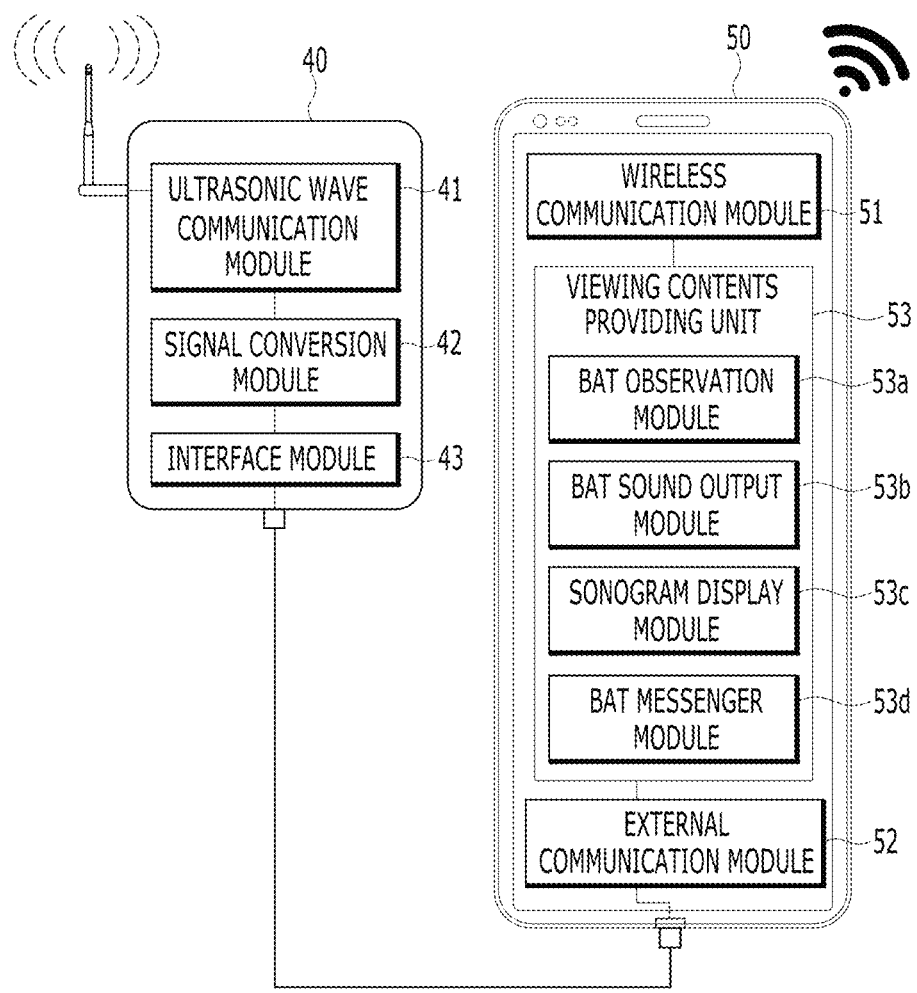
FIG. 5 is a block diagram schematically showing a configuration of a portable bat detector and user terminal according to an exemplary embodiment of the present invention.

FIG. 5 is a block diagram schematically showing a configuration of a portable bat detector and user terminal according to an exemplary embodiment of the present invention.

Referring to FIG. 5, the bat detector 40 according to an exemplary embodiment of the present invention is connected to the user terminal 50 carried by a guide or a viewer and serves to detect an ultrasonic wave of a bat, and includes an ultrasonic wave communication module 41, a signal conversion module 42, and an interface module 43.

The ultrasonic wave communication module 41 receives the ultrasonic wave of the bat, transmits the ultrasonic wave to the signal conversion module 42, and radiates an ultrasonic wave signal received by the signal conversion module 42 to the outside.

The signal conversion module 42 converts the ultrasonic wave signal of the bat received by the ultrasonic wave communication module 41 into a social call of an audible band.

In addition, the signal conversion module 42 generates sonogram pattern data based on the received ultrasonic wave of the bat according to a predetermined program. The signal conversion module 42 may amplify the ultrasonic wave and remove noise for analysis to process the sonogram pattern data for a clear sonogram pattern.

In addition, the signal conversion module 42 may generate an ultrasonic wave signal according to a sonogram waveform input from the user terminal 50.

The interface module 43 may communicate with the user terminal 50 to transmit the data received from the signal conversion module 42 to the user terminal 50 or transfer the data received from the user terminal 50 to the signal conversion module 42.

The interface module 43 may be connected to the user terminal 50 through a communication line provided with connectors at both ends, but is not limited thereto, and may be connected through short-range wireless communication such as Bluetooth.

Meanwhile, the user terminal 50 may be configured as a smartphone including a wireless communication module 51, an external communication module 52 and a viewing contents providing unit 53 (APP).

The wireless communication module 51 may transmit/receive data to/from the observation equipment 11 of the bat-box 10 and the central server 60 through the repeater 20.

The external communication module 52 may communicate with the bat detector 40 to transmit/receive data.

The viewing contents providing unit 53 is an application program (APP) installed for on-site and online viewing of a bat according to an exemplary embodiment of the present invention, and may output a social call of the bat according to the ultrasonic wave analysis as a sound, and extract and display intention information matching the social call from previously learned intention information of the bat.

To this end, the viewing contents providing unit 53 includes a bat observation module 53a, a bat sound output module 53b, a sonogram display module 53c, and a bat messenger module 53d.

The bat observation module 53a is connected to the observation equipment 11 of the bat-box 10 and may display a photographed ecological image of the bat or display an ecological image of the bat received through the central server 60.

The bat observation module 53a may display an ecological image of the bat received from the observation equipment 11 corresponding to an ID input of the bat-box 10. In addition, the bat observation module 53a may access the central server 60 through the Internet to input a nickname of a bat of interest of a viewer or an ID of the bat-box 10 and display a real-time image in a streaming manner.

The bat sound output module 53b provides sound experience contents of the bat that output sound (sound) of the bat in which an ultrasonic wave is converted into an audible band in the bat detector 40 through a speaker.

Figure 6:
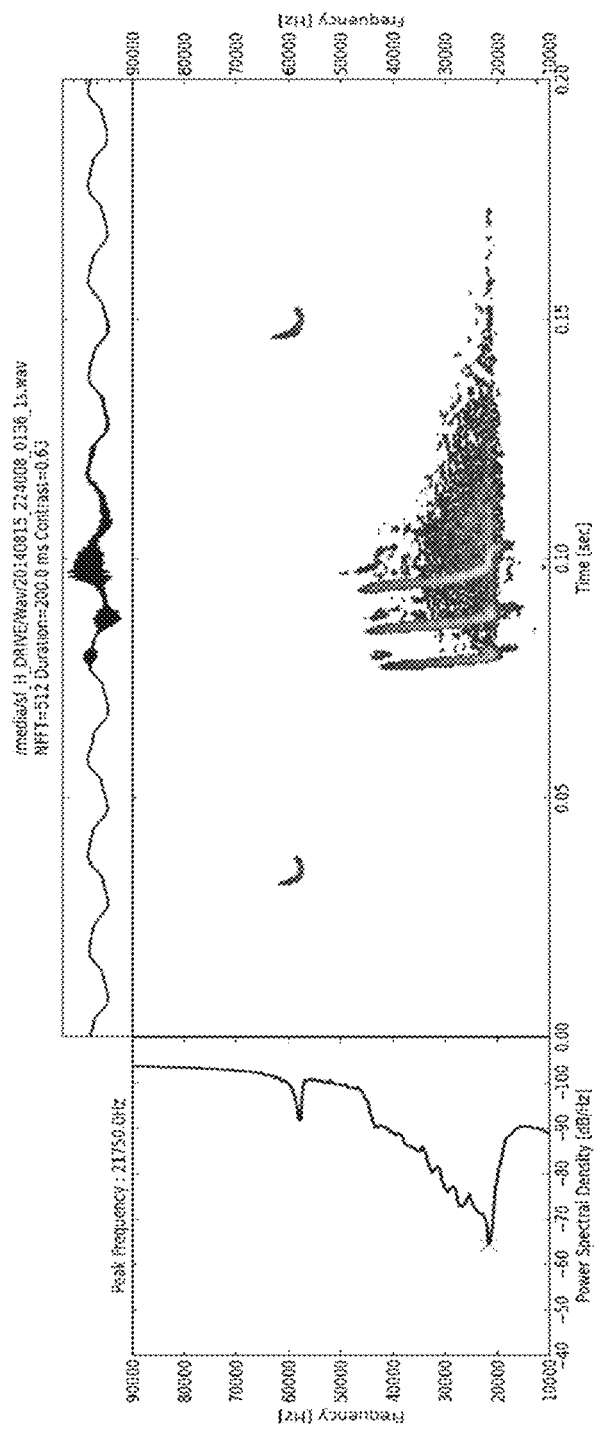
FIG. 6 shows a social call converted to an audible band by detecting an ultrasonic wave of a pipistrelle bat according to an exemplary embodiment of the present invention.

For example, FIG. 6 shows a social call converted to an audible band by detecting an ultrasonic wave of a pipistrelle bat according to an exemplary embodiment of the present invention.

Referring to FIG. 6, the user terminal 50 carried by a guide or a viewer according to an exemplary embodiment of the present invention detects the ultrasonic wave of the bat through the bat detector 40 and outputs sound converted into the social call of the audible band.

Here, the social call is an acoustic signal that converts an ultrasonic wave generated during a behavior or communication of a bat into an audible frequency that may be heard by human ears, and substantially means sound of the bat that may be heard by humans.

For example, the social call may be displayed as unique sound of various bats during a breeding period, such as learning between mother and offspring, a call for group communication, hunting for food, stress and isolation situations, etc.

In general, bats have an image that is dark and unfamiliar to humans, but when sound of a real bat is heard, the sound has the charm of a reversal that sounds like a cute and beautiful sound like a bird chirping. Therefore, it is possible to induce reconsideration of the existing image of the bat, ecological learning and interest, etc. by making viewers directly listening to a live social call of the bat as experience contents using the bat detector 40.

The sonogram display module 53c interacts with the bat detector 40 to analyze a sonogram waveform based on the ultrasonic wave of the bat, and displays intention information according to a pattern analysis of the analyzed waveform. Such a sonogram display module 53c serves as a bat analyzer or translator that converts the ultrasonic wave of the bat into previously learned intention information of the bat through an ecological research.

Figure 7:
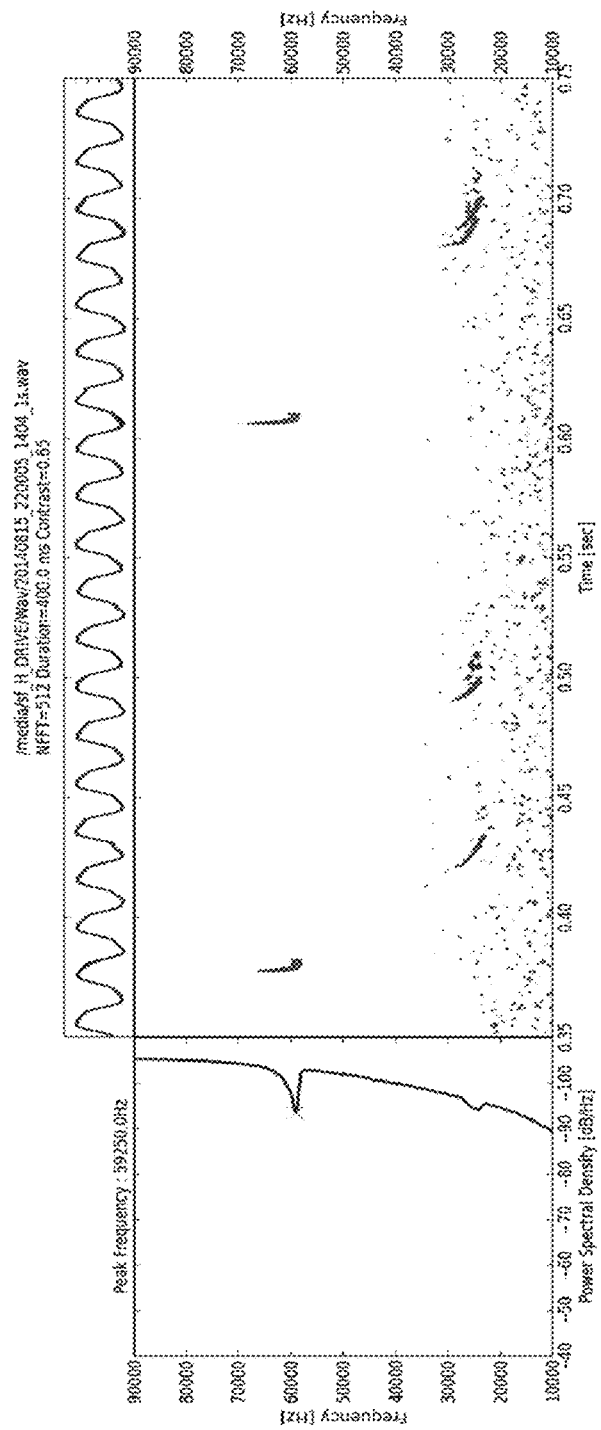
FIG. 7 shows a sonogram of a direction detection or a food hunt of a bat according to an exemplary embodiment of the present invention.

For example, FIG. 7 shows a sonogram of a direction detection or a food search of a bat according to an exemplary embodiment of the present invention.

Referring to FIG. 7, intention information of the direction detection or the food search according to the sonogram of a pipistrelle bat and a serotine bat according to an exemplary embodiment of the present invention is shown, and bold lines in a vertical direction mean a pattern of the sonogram.

At this time, echolocation used when the bat detects a direction or hunts for food indicates a difference between species, and species of the bat may be determined through an analysis of the sonogram waveform.

In addition, the sonogram display module 53c identifies species-specific intention information of the bat and intention information between individuals within a bat group through various patterns of the sonogram waveform analyzed by the bat detector 40 to display characteristics of the corresponding specific voice structure, and a function and meaning of the social call, thereby providing experience contents in which behavior of the bat and communication thereof may be recognized.

Here, the intention information means information derived from ecological communication of the bat by accumulating pattern data of the sonogram waveform collected during a species-specific behavior through an ecological research of bats, and learning accumulated information through artificial intelligence.

The bat messenger module 53d provides a messenger user interface (UI) that allows viewers to directly communicate with the bat through the ultrasonic wave by utilizing a function of at least one of the modules described above.

For example, the bat messenger module 53d may convert a sonogram waveform of specific communication (e.g., a danger warning) input from a visitor into an ultrasonic wave and transmit the sonogram waveform through the bat detector 40, and provide experience contents of communication with the bat in which a behavior (e.g., a danger alarm and a swarm flight, etc.) of the bat reacting to transmission of the ultrasonic wave of the visitor and echolocation may be observed.

The viewing contents providing unit 53 is input and output through a touch screen of the user terminal 50, and the species-specific intention information of the bat learned by the central server 60 is updated to enable a variety of communication.

The central server 60 is a computing system that controls the overall operation of a bat exhibition and viewing system according to an exemplary embodiment of the present invention.

The central server 60 learns the species-specific intention information according to ecological activities of the bat and the function and meaning of the specific voice structure of the bat to make a database (DB) and provides on-site viewing contents inside an exhibition hall and online exhibition contents outside the exhibition hall based on the data.

Figure 8:
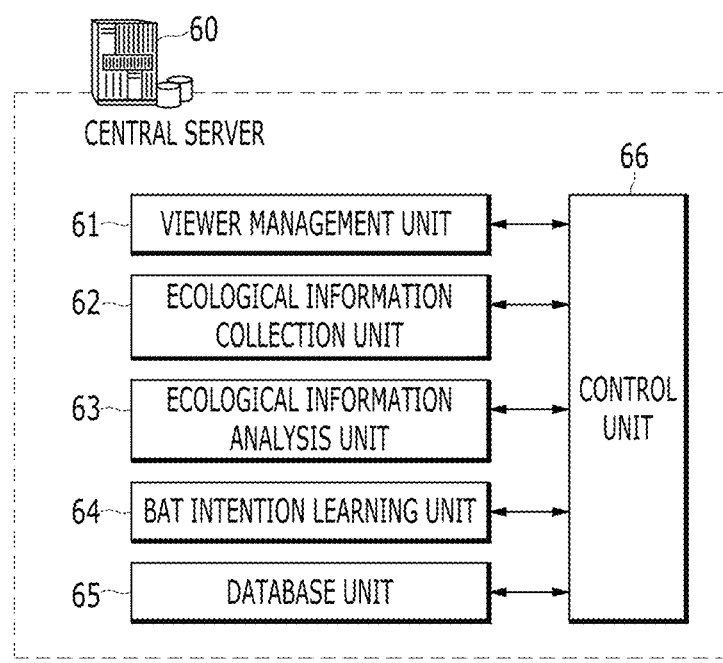
FIG. 8 is a block diagram schematically showing a configuration of a central server according to an exemplary embodiment of the present invention.

FIG. 8 is a block diagram schematically showing a configuration of a central server according to an exemplary embodiment of the present invention.

Referring to FIG. 8, the central server 60 according to an exemplary embodiment of the present invention includes a viewer management unit 61, an ecological information collection unit 62, an ecological information analysis unit 63, a bat intention learning unit 64, a database unit 65 and a control unit 66.

The viewer management unit 61 matches and registers the bat-box 10 produced with the participation of viewers and viewer information (e.g., a phone number, an email, etc.), and manages online access through an Internet site or the viewing contents providing unit 53.

The ecological information collection unit 62 collects and stores ecological information including images and ultrasonic waves of bats from the observation equipment 11 of the bat-box 10.

The ecological information analysis unit 63 analyzes the ecological information of the bats collected by the ecological information collection unit 62, and derives a sonogram including types of the bats, social calls of an audible band, and an intention signal. The ecological information analysis unit 63 may amplify the ultrasonic wave and remove noise for analysis to process the sonogram for a clear sonogram pattern.

The bat intention learning unit 64 derives species-specific intention information that is a standard for determining intention information of the sonogram by performing link learning through a synthetic neural network based on the ecological information of the bats input from the ecological information analysis unit 63 to make the database DB.

Figure 9:
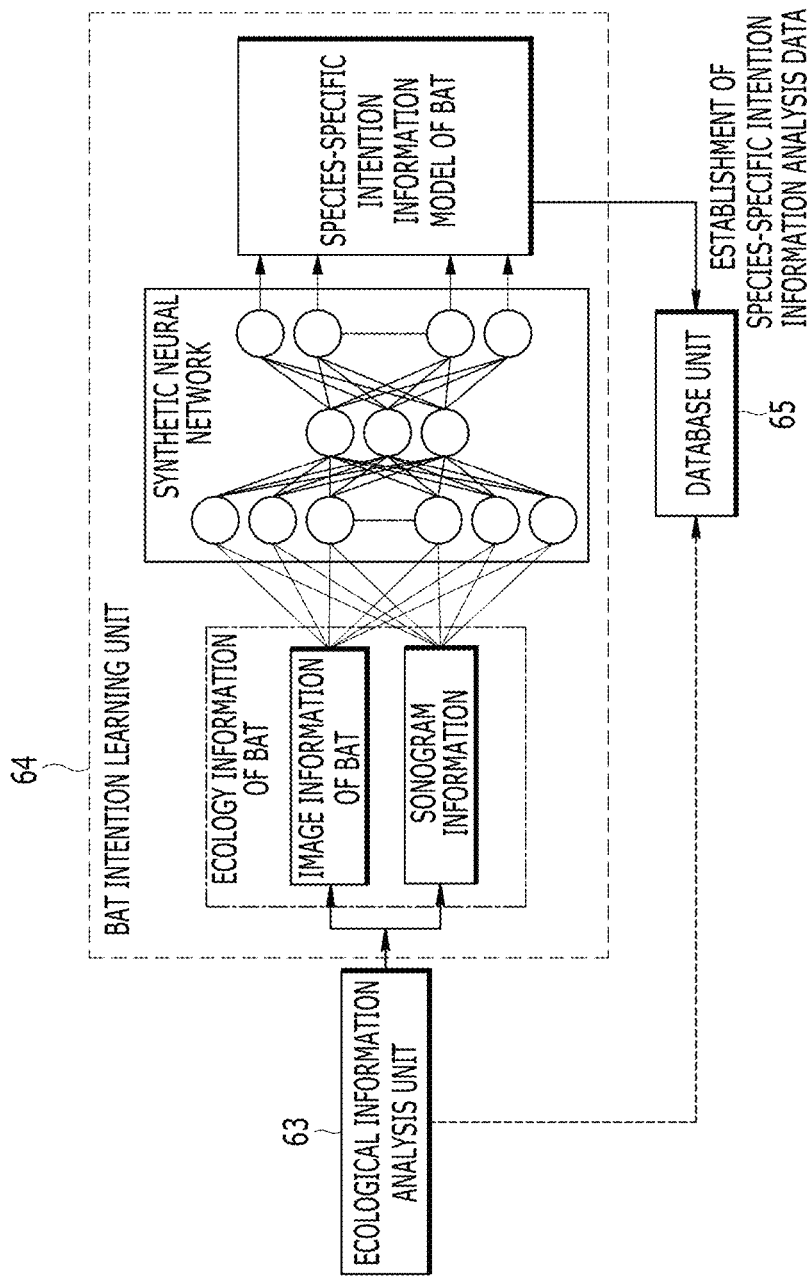
FIG. 9 shows a method of learning species-specific intention information of various bats according to an exemplary embodiment of the present invention.

FIG. 9 shows a method of learning species-specific intention information of various bats according to an exemplary embodiment of the present invention.

Referring to FIG. 9, the bat intention learning unit 64 trains bat image information and sonogram information collected by the ecological information analysis unit 63 as input factors through a synthetic neural network that analyzes the intention information with respect to ultrasonic wave signals of bats for species.

Here, the synthetic neural network previously learns to match behavioral characteristic parameters of various species-specific bat image information and intention information parameters according to various sonogram patterns for an intention information analysis of bats. Through this, as previously trained species-specific intention information models of bats are accumulated, the bat intention learning unit 64 is capable of deriving intention information with respect to various sonogram patterns for species.

DB of the species-specific intention information may be utilized for a sonogram analysis of the ecological information analysis unit 63.

For example, FIGS. 10 to 14 show species-specific intention information according to a sonogram pattern analysis of various bats according to an exemplary embodiment of the present invention.

Figure 10:
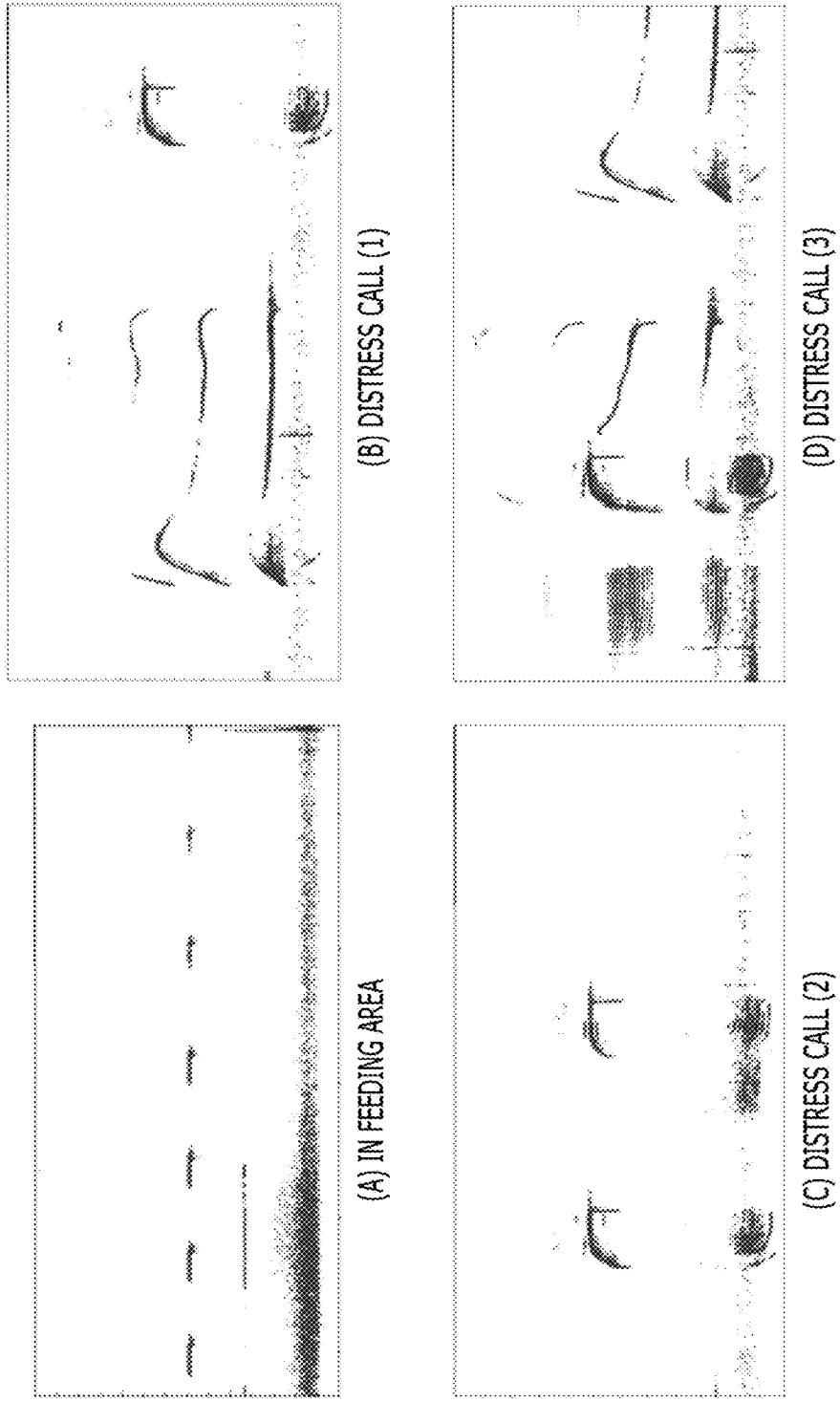
FIGS. 10 to 14 show species-specific intention information according to a sonogram pattern analysis of various bats according to an exemplary embodiment of the present invention.

First, referring to FIG. 10, various sonogram patterns obtained by analyzing an ultrasonic wave according to echolocation of a horseshoe bat are shown.

The sonogram pattern of FIG. 10(A) may be recognized as a free flight of the horseshoe bat in a feeding area, and the sonogram patterns of FIGS. 10(B) to 10(D) are distress calls of the horseshoe bat and may be recognized as being in trouble or in a dangerous situation.

Figure 11:
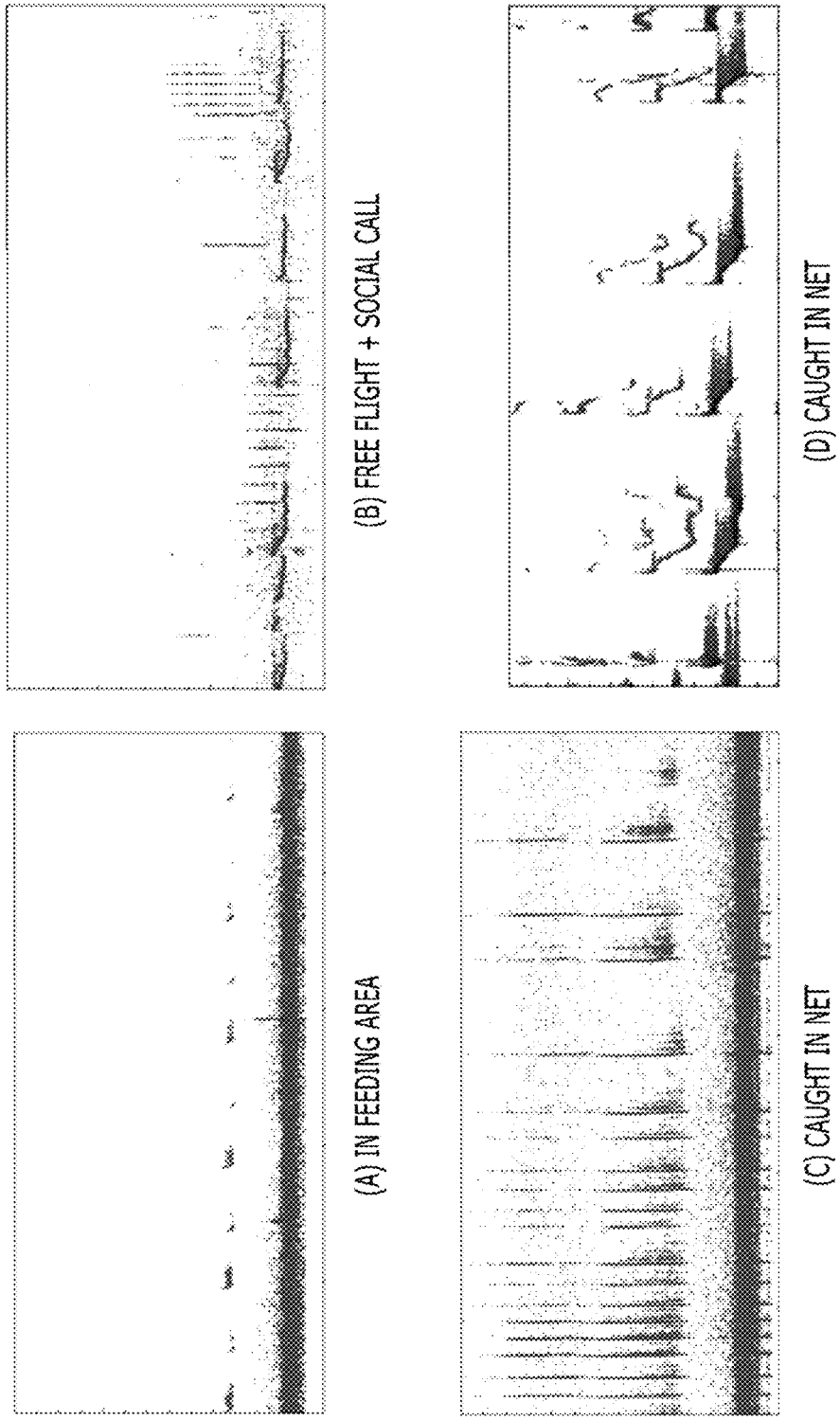

Next, referring to FIG. 11, various sonogram patterns obtained by analyzing an ultrasonic wave according to echolocation of a pipistrelle bat are shown.

The sonogram pattern of FIG. 11(A) may be recognized as a free flight of the pipistrelle bat in a feeding area, and the sonogram pattern of FIG. 11(B) may be recognized as the pipistrelle bat just before waking up from roost sites and feeding. The sonogram pattern of FIG. 11(C) may be recognized as a distress when the pipistrelle bat is caught in a net, and the sonogram pattern of FIG. 11(D) may be recognized as the pipistrelle bat giving birth in roost sites.

Figure 12:
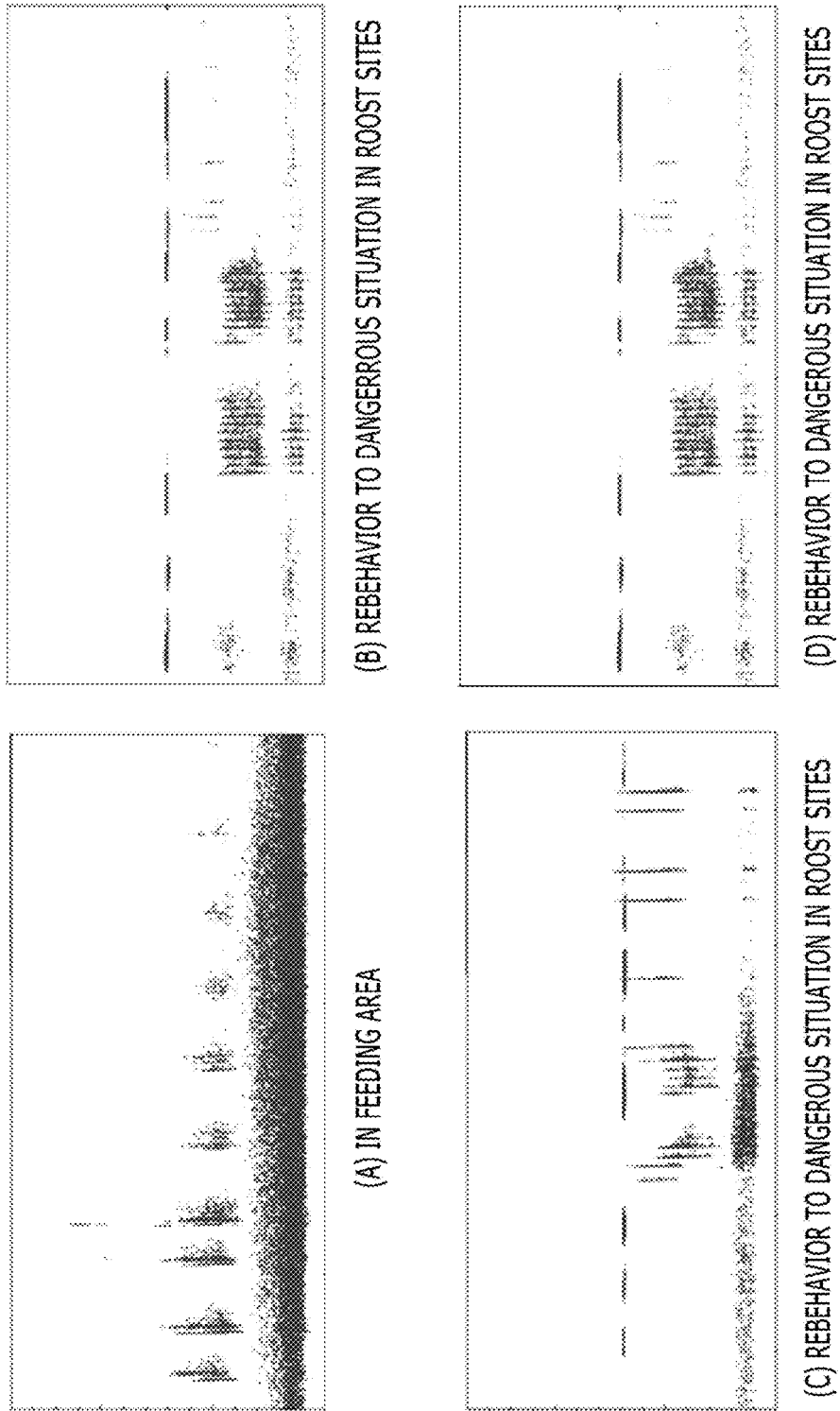

Next, referring to FIG. 12, various sonogram patterns obtained by analyzing an ultrasonic wave according to echolocation of a water-bearded bat are shown.

The sonogram pattern of FIG. 12(A) may be recognized as a free flight of the water-bearded bat in a cave, and the sonogram patterns of FIGS. 12(B) to 12(D) may be recognized as the water-bearded bat in roost sites reacting to dangerous situations in the cave.

Figure 13:
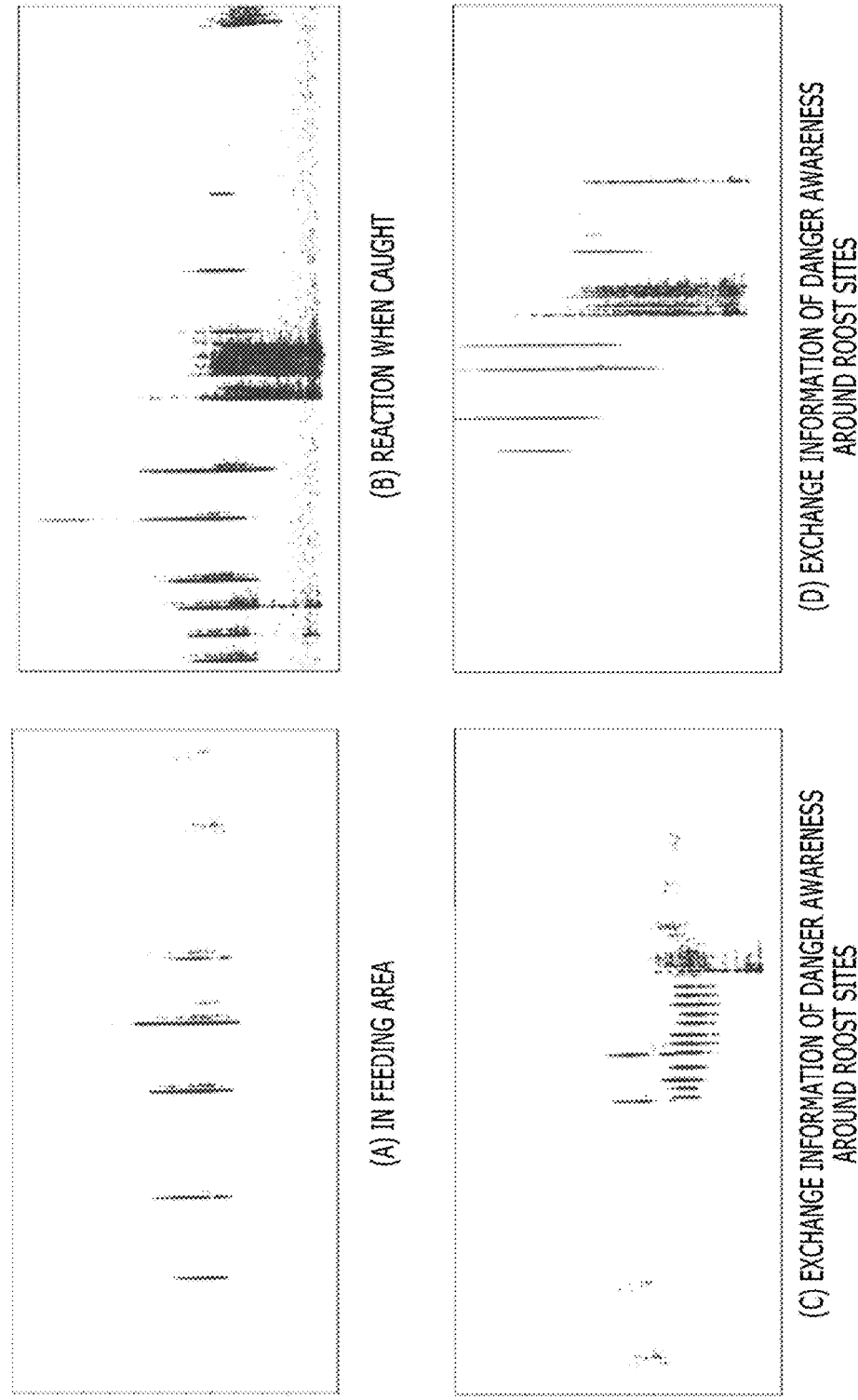

Next, referring to FIG. 13, various sonogram patterns obtained by analyzing an ultrasonic wave according to echolocation of a red bat are shown.

The sonogram pattern of FIG. 13(A) may be recognized as a free flight of the red bat in a feeding area, the sonogram pattern of FIG. 13(B) may be recognized as a distress when the red bat is caught in a net or bag, and the sonogram patterns of FIGS. 13(C) and 13(D) may be recognized as the red bat exchanging danger awareness around roost sites.

Figure 14:
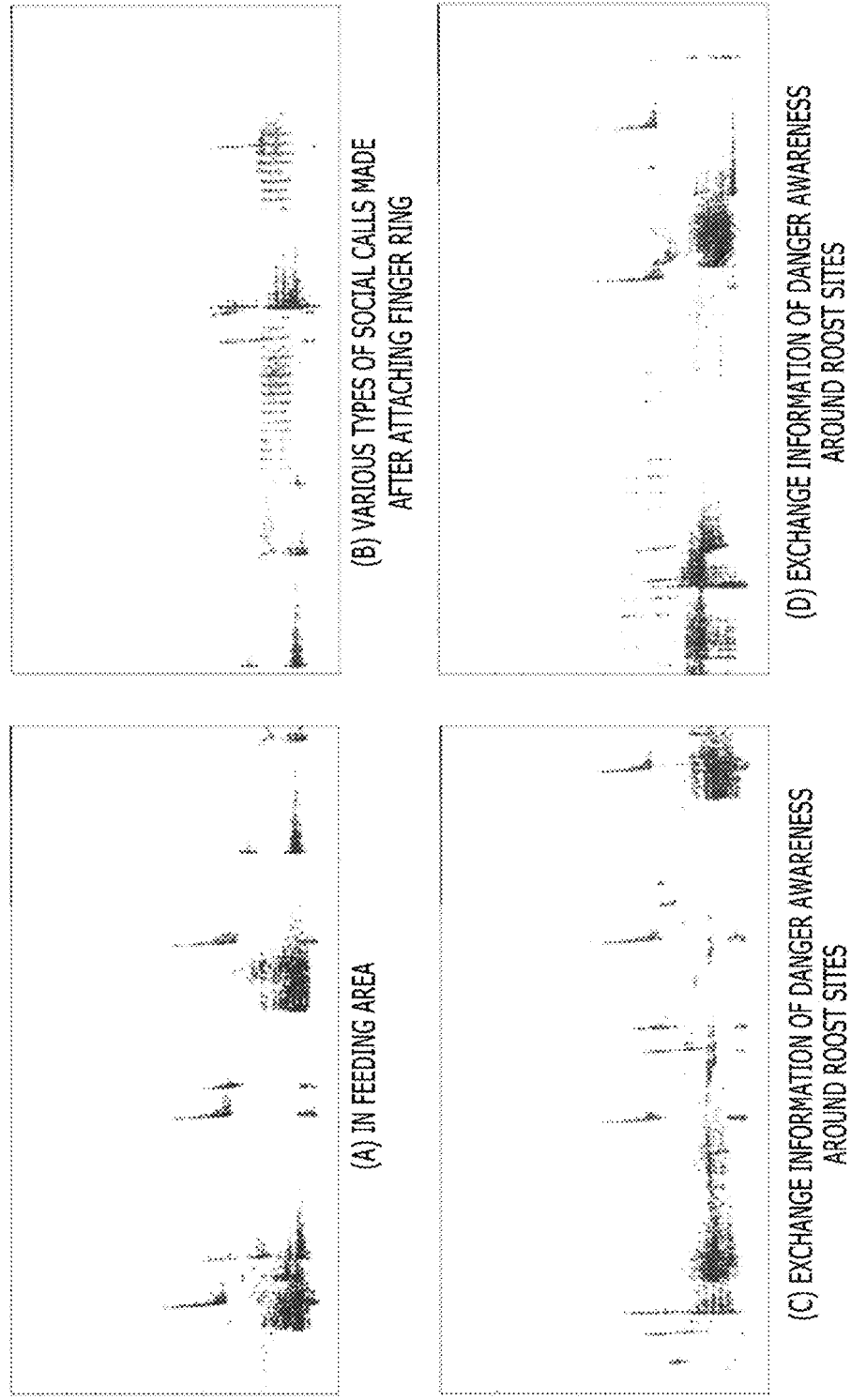

Next, referring to FIG. 14, various sonogram patterns obtained by analyzing an ultrasonic wave according to echolocation of a brown long-eared bat are shown.

The sonogram pattern of FIG. 14(A) may be recognized as a free flight of the brown long-eared bat in a feeding area, and the sonogram pattern of FIG. 14(B) means various types of social calls that the brown long-eared bat emit after attaching a finger ring for individual recognition. The sonogram patterns of FIGS. 14(C) and 14(D) may be recognized as the brown long-eared bat exchanging danger awareness around roost sites.

In addition, the bat intention learning unit 64 may collect ecological information of bats from research groups around the world as well as bats at the given the region, and accordingly learn species-specific intention information, and make a database (DB). Therefore, it is possible to build big data that may confirm communication through ultrasonic waves of various bats distributed around the world, and through this, there is an advantage that the big data may be utilized for an intention information recognition-based ecological research of various bats for species.

The database unit 65 stores various programs and data for the operation of the central server 60, and stores and manages data generated according to the operation.

The database unit 65 may continuously update the species-specific intention information of bats that is DB made by the bat intention learning unit 64.

The control unit 66 is a central processing unit that controls an operation of each unit for the operation of the central server 60 according to an exemplary embodiment of the present invention.

The control unit 66 may transmit a live bat image and communication information to the user terminal 50 connected through the display 30 or the viewing application program (APP) based on the ecological information received from the observation equipment 11 of the bat-box 10 when a viewer visits to view.

In addition, the control unit 66 may provide ecological information of the bat-box 10 matching to viewer information upon request of the viewer accessed through an Internet site or the viewing contents providing unit 53.

The control unit 66 may transmit, to the user terminal 50, ecological event information of the bat, such as moving of the bat, childbirth and birthday, a first flight of offspring and feeding activity success and hibernation, obtained by monitoring the bat-box 10 through the observation equipment 11.

At this time, the control unit 66 may group registered viewers who participated in the production of the bat-box 10 to create a community site of a nickname (e.g., family of Park Dol-yi and Jui Soon-yi) of a bat of interest, and, provide and share a live image and ecological event information (e.g., population increase, marriage, childbirth, etc.) according to ecological activities of the bat through the community site. For example, the community site may be built into groups such as families, schools, clubs, number of viewers, societies, and supporters associations for each bat-box 10. Even if a viewer does participate in the production, an additional subscription is possible according to a request of a following viewer. Through this, online bat ecology contents may be provided outside an exhibition hall through a community that connects the bats living in the bat-box 10 and viewers.

In addition, the control unit 63 may match the behavior of the bat for each type, the social call of the audible band, and the sonogram thereof to provide as online contents, and if any one of them is selected, transmit and display matching information. For example, when a sonogram having a specific communication is selected, a behavior image and sound of the bat matching the sonogram may be together provided.

As such, the central server 60 may provide contents to allow viewers to directly visit and experience the contents of seeing, hearing, and communicating live behaviors and sound of bats in the field and support viewers to participate in the production of the bat-box 10 and the construction of habitats as well as experience ecological activities of a bat of interest that lives in the habitat when the viewers return home.

In addition, there is an advantage in that a bat viewing infrastructure that facilitates an expansion of bat habitat is established through the participation of viewers, and simultaneously is utilized as an ecological research infrastructure resource of bats.

Meanwhile, based on the bat exhibition and viewing system described above, a method of providing bat exhibition and viewing according to an exemplary embodiment of the present invention will be described assuming one scenario including a visit to an exhibition hall and viewing and a subsequent online viewing.

Figure 15:
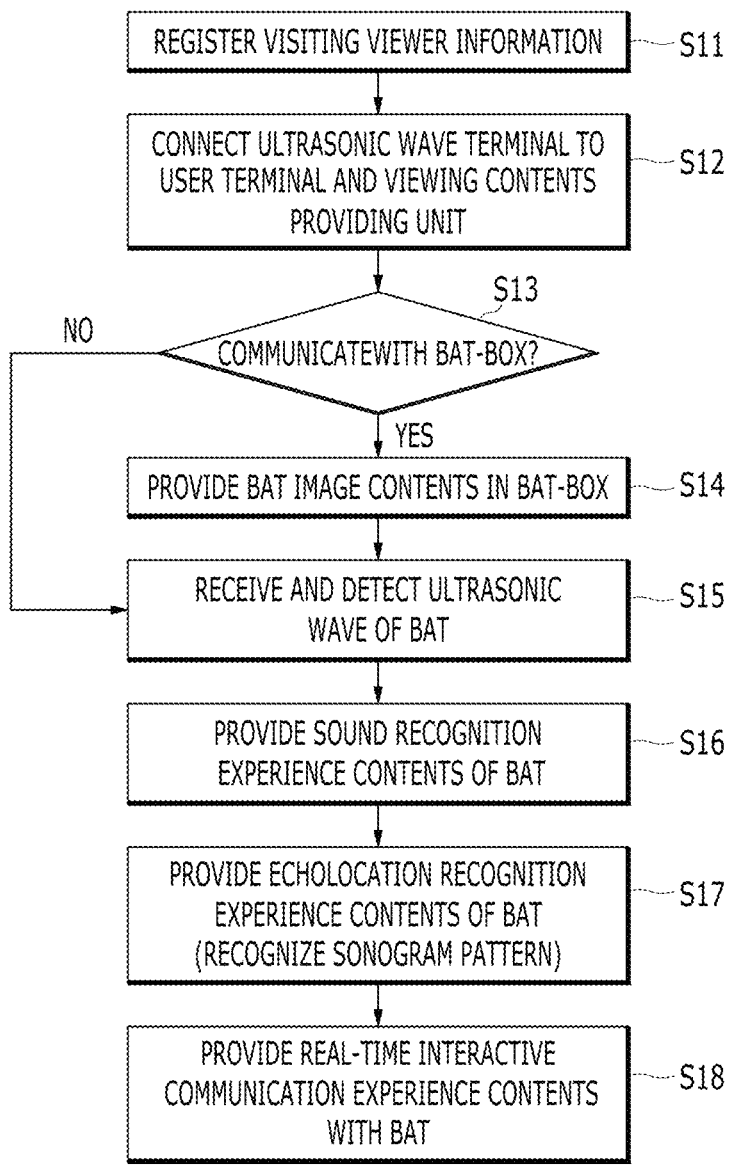
FIG. 15 is a flowchart illustrating a method of providing bat exhibition viewing contents to viewers visiting to an exhibition hall according to an exemplary embodiment of the present invention.

First, FIG. 15 is a flowchart illustrating a method of providing bat exhibition viewing contents to viewers visiting to an exhibition hall according to an exemplary embodiment of the present invention.

Referring to FIG. 15, the central server 60 registers information (a phone number/e-mail, etc.) of a viewer to the exhibition hall (S11). At this time, the central server 60 may create a community site by grouping at least one viewer information (e.g., a phone number, e-mail, etc.) matching an ID of the bat-box 10 produced with the participation of the viewers.

The user terminal 50 of the viewer is connected to the bat detector 40 provided when viewing the field, and the viewing contents providing unit 53 is installed and executed for viewing (S12). At this time, the viewing contents providing unit 53 operates as follows based on the user terminal 50.

The viewing contents providing unit 53 receives image information from the observation equipment 11 when communication is connected with the observation equipment 11 of the bat-box 10 selected through the user terminal 50 (S13; Yes) and provides image contents of a bat inhabiting the bat-box 10 (S14). In addition, the viewing contents providing unit 53 may receive an ultrasonic wave signal of the bat in the bat-box 10 from the observation equipment 11 (S15) and provide a variety of viewing contents, which will be described later.

Meanwhile, if the viewing contents providing unit 53 is not connected to the bat-box 10 (S13; No), the viewing contents providing unit 53 detects the ultrasonic wave signal of the bat through the bat detector 40 connected to the user terminal 50 (S15).

The viewing contents providing unit 53 divides the ultrasonic wave signal of the bat collected through the bat detector 40 into echolocation and a social call, converts the ultrasonic wave signal into audible sound, and provides the audible sound as sound recognition experience contents of the bat outputting sound of the bat (S16). At this time, the viewing contents providing unit 53 may provide the sound recognition experience contents of the bat by audibly outputting the social call of the bat according to an analysis of the ultrasonic wave signal so that the viewer may hear the social call.

In addition, the viewing contents providing unit 53 analyzes a sonogram waveform based on an ultrasonic wave frequency through the bat detector 40, and provides echolocation recognition experience contents of the bat that visually display intention information according to a pattern analysis of the analyzed waveform (S17). At this time, the viewing contents providing unit 53 visually displays species-specific intention information of the bat identified through the pattern of the sonogram waveform so that the viewer may recognize the behavior and communication of the bat live in the field.

In addition, the viewing contents providing unit 53 transmits the sonogram waveform for communication with the bat as an ultrasonic wave through the bat detector 40, and provides real-time interactive communication experience contents in which the behavior of the bat reacting to transmission of the ultrasonic wave and echolocation may be observed (S18). At this time, the viewing contents providing unit 53 may synthesize and use social calls as a trigger for communication with the bat, and analyze and display actual reaction behavior and social call of the bat.

In the above process, exhibition viewers may collect and provide new intention information for additional learning of the central server 60, and the central server 60 may provide a variety of contents supplemented through learning. Therefore, the existing passive viewer may be the subject of the exhibition and act as a creator, and thus, a more precise interpretation of ecological information is possible through accumulated information, and a system may be built in which exhibition contents are self-developed and purified.

The above method of providing exhibition viewing contents assumes one viewing scenario, and the order of providing the contents is not limited to the above. Steps S13 to S18 may be repeatedly performed as necessary due to a change of a bat-box and a movement of a habitat place Next, FIG. 16 is a flowchart illustrating a method of providing bat exhibition viewing contents to viewers accessed online according to an exemplary embodiment of the present invention.

Figure 16:
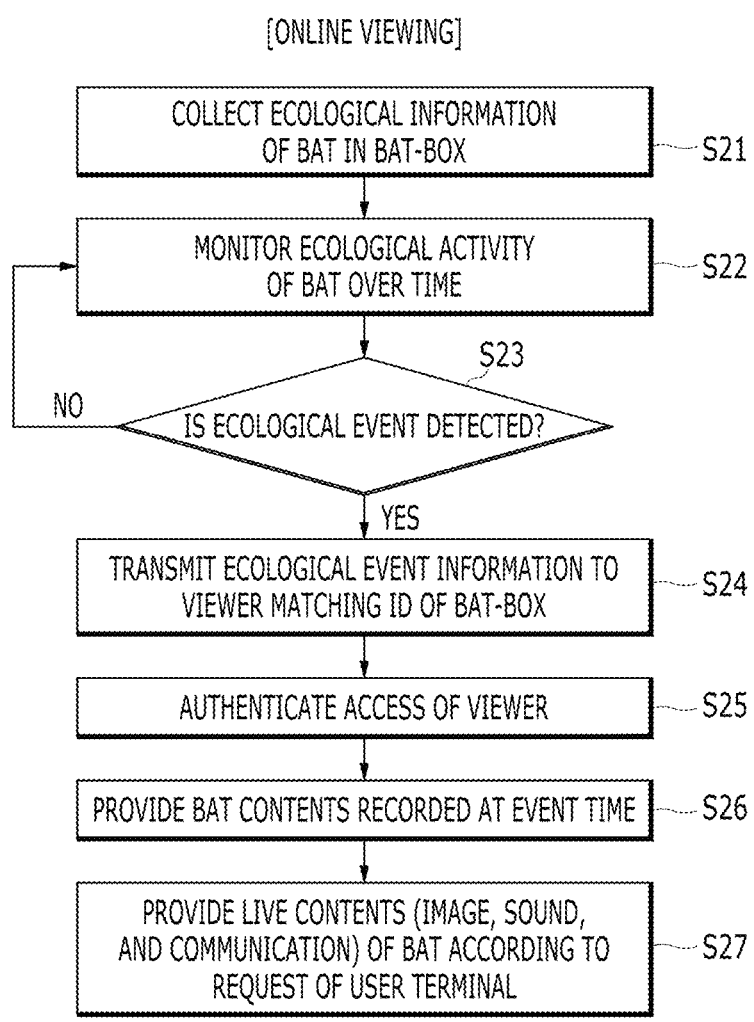
FIG. 16 is a flowchart illustrating a method of providing bat exhibition viewing contents to viewers accessed online according to an exemplary embodiment of the present invention.

Referring to FIG. 16, the central server 60 collects and stores ecological information of a bat including an image and ultrasonic wave of the bat from the observation equipment 11 of the bat-box 10 (S21).

The central server 60 analyzes the collected ecological information of the bat and monitors an ecological activity of the bat over time (S21). The monitoring may be performed for each ID of a bat-box, and the ecological activity of the bat is naturally monitored in a process of analyzing the ecological information of the bat usually and learning a type of the bat, a social call of an audible band and an intention signal.

When ecological event information, such as moving of the bat, childbirth and birthday, a first flight of offspring and feeding activity success and hibernation, is detected during monitoring the bat-box 10 through observation equipment 11 (S23; Yes), the central server 60 transmits the ecological event information to the user terminal 50 of viewer information matching the corresponding ID of the bat-box (S24). At this time, the central server 60 may publish the ecological event information on a community site matching the ID of the bat-box, and transmit a link of the posting to the user terminal 50.

The central server 60 authenticates access of a viewer accessed according to transmission of the ecological event information (S25), and provides bat contents recorded at an event time corresponding to the moving of the bat, childbirth and birthday, and hibernation (S26). For example, the recorded contents may include a highlight image, a social call and communication information collected and recorded at the time of occurrence of an event, such as when the bat first moves into a bat-box.

In addition, the central server 60 may provide live contents including at least one of a live image of the bat, the social call, and the communication information based on the ecological information of the bat received from the observation equipment 11 matching the ID of the bat-box according to a request of the user terminal 50 (S27).

Thereafter, the central server 60 may end provision of online viewing contents when the user terminal 50 is disconnected.

As such, an exemplary embodiment of the present invention, it is possible to reconsider an image of existing bats and stimulate interest in ecological learning by providing a variety of experience contents that allows viewers to directly see, hear, and communicate with bats in a habitat.

In addition, it is possible to provide viewing contents of bats that overcome temporal and spatial limitations by supporting viewers to directly participate in a production of a bat-box and observe ecological activities of bats of interest inhabiting the bat-box through online.

In addition, it is possible to construct an infrastructure for viewing bats that facilitates a habitat expansion by producing a bat-box through participation of viewers and simultaneously utilizing the bat-box as an infrastructure resource for an ecology research of bats.

In the above, although an exemplary embodiment of the present invention has been described, the present invention is not limited to the above exemplary embodiment and various other modifications are possible.

For example, in an exemplary embodiment of the present invention shown in FIG. 5, it has been described that the user terminal 50 in which the viewing contents providing unit 53 is installed is connected to and interacts with the bat detector 40 for bat exhibition and viewing.

However, an exemplary embodiment of the present invention is not limited thereto, and the bat detector 40 may be configured as an information communication terminal capable of at least executing the viewing contents providing unit 53 and outputting contents. Therefore, there is an advantage in that it is possible to provide bat exhibition and viewing without connection with the user terminal 50.

An exemplary embodiment of the present invention is not implemented only through the device and/or method described above, may be implemented through a program for realizing a function corresponding to the configuration of an exemplary embodiment of the present invention, and a recording medium recording the program thereon, etc., and this implementation may be easily implemented by an expert in the technical field to which the present invention pertains from the description of the exemplary embodiment described above.

While the present invention has been particularly shown and described with reference to exemplary embodiments thereof, the scope of rights of the present invention is not limited thereto and various modifications and improvements of those skilled in the art using the basic concept of the present invention as defined in the following claims are also within the scope of the present invention.

The invention claimed is:

1. A bat exhibition and viewing system for providing habitat-based bat ecological viewing contents, the bat exhibition and viewing system comprising:
    a bat detector including an ultrasonic wave communication module for detecting an ultrasonic wave signal of a bat and radiating an ultrasonic wave signal generated therein to the outside; a signal conversion module for converting the detected ultrasonic wave signal of the bat into a social call of an audible band; and an interface module communicating with an external information communication terminal to transmit data received from the signal conversion module;
    a viewing contents providing unit installed in the information communication terminal, audibly outputting sound of the bat in accordance with the social call, and extracting intention information matching the social call from previously learned bat species-specific intention information to visually display the intention information;
    a bat-box manufactured in the form of a box provided with an entrance and equipped with observation equipment for obtaining ecological information of the bat including an image and the ultrasonic signal of the bat;
    a central server for learning the species-specific intention information according to ecological activities of the bat and making a database (DB), and providing on-site viewing contents inside an exhibition hall and online exhibition contents outside the exhibition hall based on the DB; and a repeater connected to the observation equipment through wireless communication to repeat communication with the information communication terminal and the central server.

2. The bat exhibition and viewing system of claim 1, wherein:
the information communication terminal is a user terminal carried by a viewer, and
wherein the bat detector further includes an interface module communicating with the user terminal to transmit the data received from the signal conversion module to the user terminal, or transfer the data received from the user terminal to the signal conversion module.

3. The bat exhibition and viewing system of claim 1, wherein:
the signal conversion module is configured to generate sonogram pattern data by amplifying the detected ultrasonic wave signal of the bat and removing noise, and generate an ultrasonic wave signal according to a sonogram waveform input from the information communication terminal.

4. The bat exhibition and viewing system of claim 1, wherein:
the observation equipment includes an ultrasonic wave communication module including an ultrasonic wave receiver and an ultrasonic wave transmitter;
a wireless communication module for performing wireless communication with at least one information communication terminal among a user terminal and a central server through unique identification information (ID);
a camera module including at least one image sensor for photographing ecological information of the bat inhabiting the bat-box;
a memory storing information collected by the ultrasonic wave communication module and the camera module at the same time; and
a control module for transmitting the ecological information of the bat according to a request of the information communication terminal connected through the repeater.

5. The bat exhibition and viewing system of claim 4, wherein:
the image sensor includes a general complementary metal-oxide semiconductor (CMOS) image sensor capable of photographing and recording video and an infrared image sensor capable of night photographing.

6. The bat exhibition and viewing system of claim 1, wherein:
the viewing contents providing unit includes a bat observation module for live displaying an ecological image of the bat photographed in the bat-box;
a bat sound output module for providing sound experience contents of the bat in which sound of the bat converted into the audible band is audibly output;
a sonogram display module for analyzing a sonogram waveform based on the ultrasonic wave of the bat, comparing a pattern of the analyzed waveform with the specifies-specific intention information and displaying confirmed intention information; and
a bat messenger module for providing a messenger user interface (UI) that allows visitors to directly communicate with the bat through an ultrasonic wave by utilizing each module of the viewing contents providing unit.

7. The bat exhibition and viewing system of claim 6, wherein:
the bat observation module is configured to display real-time ecological image contents of the bat received from the observation equipment corresponding to a selective ID input of the bat-box or display real-time streaming ecological image contents of the bat through access of the central server.

8. The bat exhibition and viewing system of claim 6, wherein:
the sonogram display module is configured to determine species of the bat by analyzing a sonogram waveform of echolocation used when the bat detects a direction or hunts for food.

9. The bat exhibition and viewing system of claim 8, wherein:
the sonogram display module is configured to provide experience contents in which a behavior of the bat and communication thereof are recognized by identifying intention information between individuals within a bat group through a pattern of the sonogram waveform to express characteristics of a specific voice structure and a function and meaning of the social call.

10. The bat exhibition and viewing system of claim 6, wherein:
the bat messenger module is configured to convert a sonogram waveform of certain communication input from the viewer into an ultrasonic wave and transmit the sonogram waveform through the bat detector, and provide experience contents of communication with the bat in which communication with a behavior of the bat reacting to transmission of the ultrasonic wave and sound of echolocation is observed.

11. The bat exhibition and viewing system of claim 1, wherein:
the central server includes a visitor management unit for matching and registering the bat-box and viewer information and managing online access;
an ecological information collection unit for collecting and storing ecological information including an image and an ultrasonic wave of the bat from the observation equipment of the bat-box;
an ecological information analysis unit for analyzing the collected ecological information of the bat to derive a type of the bat, a social call of an audible band, and a sonogram pattern;
a bat intention learning unit for deriving the species-specific intention information that is a standard for determining intention information of a sonogram by link learning the ecological information of the bat through a synthetic neural network;
a database unit for continuously updating the species-specific intention information learned by the bat intention learning unit; and
a control unit for transmitting a live bat image and communication information to the user terminal connected through the viewing contents providing unit based on the ecological information received from the observation equipment when a visitor visits to view.

12. The bat exhibition and viewing system of claim 11, wherein:
the bat intention learning unit is configured to train bat image information and sonogram information received by the ecological information analysis unit as input factors through a synthetic neural network that analyzes intention information with respect to ultrasonic wave signals of bats for species.

13. The bat exhibition and viewing system of claim 12, wherein:
the synthetic neural network is configured to previously learn to match behavioral characteristic parameters of various species-specific bat image information and intention information parameters according to various sonogram patterns for an intention information analysis of the bat.

14. The bat exhibition and viewing system of claim 11, wherein:
the control unit is configured to match and transmit ecological event information of at least one of a moving of the bat, a childbirth and a birthday, a first flight of offspring and a feeding activity success and a hibernation obtained by monitoring a bat-box through the observation equipment to a user terminal of a registered viewer, and provide contents according to the ecological event information upon a request of the viewer accessed online through Internet or the viewing contents providing unit.

15. The bat exhibition and viewing system of claim 14, wherein:
the control unit is configured to group registration information of visitors who participated in the production of the bat-box to create a community site of a bat of interest, and provide a live image and ecological event information according to ecological activities of the bat through the community site.

16. A bat exhibition and viewing method of providing viewing contents according to ecological activities of a bat based on a bat exhibition and viewing system, the bat exhibition and viewing method comprising:
a) detecting an ultrasonic wave signal of the bat through a bat detector connected to a user terminal of a viewer;
b) dividing the ultrasonic wave signal of the bat collected through the bat detector into echolocation and a social call and converting the ultrasonic wave signal into audible sound;
c) receiving a signal converted into a social call of an auditable band and audibly outputting sound of the bat by a viewing contents providing unit application program (APP) installed in the user terminal; and
d) extracting and visually displaying, by the viewing contents providing unit, species-specific intention information matching the detected social call from previously learned species-specific echolocation of the bat and social call data of communication between individuals within a group,
wherein, after d), transmitting a sonogram waveform for communication with the bat as an ultrasonic wave through the bat detector; and providing real-time interactive communication experience contents by analyzing an ultrasonic wave according to a behavior of the bat reacting to transmission of the ultrasonic wave and echolocation and displaying sound of the bat and communication information.

17. The bat exhibition and viewing method of claim 16, further comprising: before a), matching and storing, by a central server, viewer information and a bat-box produced with the participation of visiting viewers; communicating with observation equipment of the bat-box selected through the user terminal by the viewing contents providing unit; and receiving image information from the observation equipment to provide image contents of the bat in the bat-box by the viewing contents providing unit.

18. The bat exhibition and viewing method of claim 17, further comprising:
after visiting of the viewer,
detecting, by the central server, ecological event information of at least one of a moving of the bat, a childbirth, a birthday, and a hibernation while monitoring the bat-box through the observation equipment;
transmitting the ecological event information to the user terminal of visitor information matching an ID of the bat-box; and
authenticating the visitor information accessed online according to transmission of the ecological event information, and providing an image of the bat, sound and communication contents recorded at a time of the ecological event information.

* * * * *